United States Patent [19]
Kerr et al.

[11] 4,089,002
[45] May 9, 1978

[54] CFAR THRESHOLD ADAPTIVE TARGET COORDINATE EXTRACTOR

[75] Inventors: Leo A. Kerr; Allen I. Sinsky; Richard Gonsalves, all of Baltimore County, Md.

[73] Assignee: The Bendix Corporation, Southfield, Mich.

[21] Appl. No.: 784,762

[22] Filed: Apr. 5, 1977

[51] Int. Cl.² .............................................. G01S 7/44
[52] U.S. Cl. .............................. 343/11 R; 343/5 DP
[58] Field of Search ........................... 343/5 DP, 11 R

[56] References Cited
U.S. PATENT DOCUMENTS

| 2,999,236 | 9/1961 | Lewinter | 343/11 R |
| 3,077,595 | 2/1963 | Frost | 343/11 R |
| 3,359,442 | 12/1967 | Groginsky | 343/5 DP X |

*Primary Examiner*—T.H. Tubbesing
*Attorney, Agent, or Firm*—W. G. Christoforo; Bruce L. Lamb

[57] ABSTRACT

The positive portion of the differentiated negative envelope of a detected radar return signal is divided into range cells. The first range cell is taken and doubled to provide a first and succeeding range cell to comprise a Doublet. The Doublets are integrated in a sliding window detector and beam split to supply the target coordinates.

4 Claims, 9 Drawing Figures

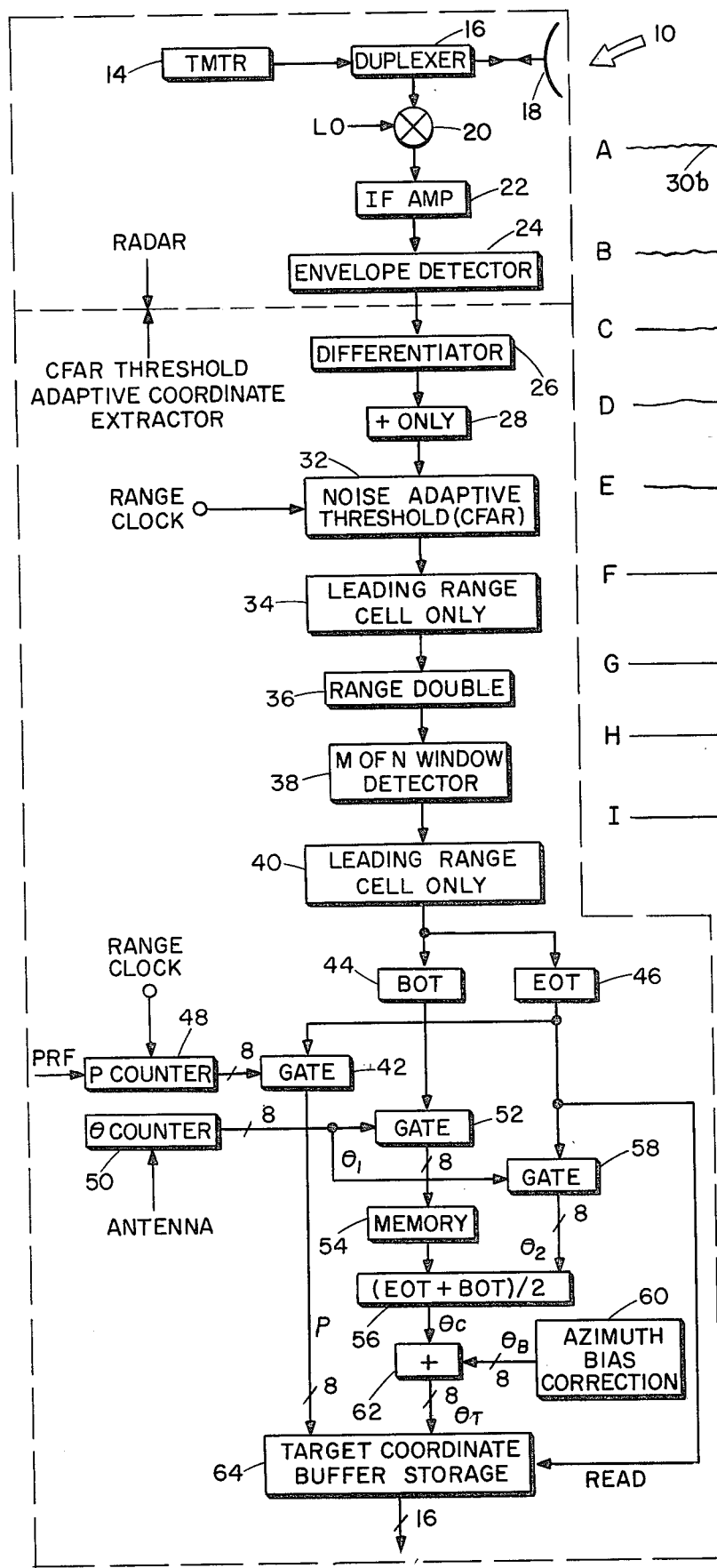
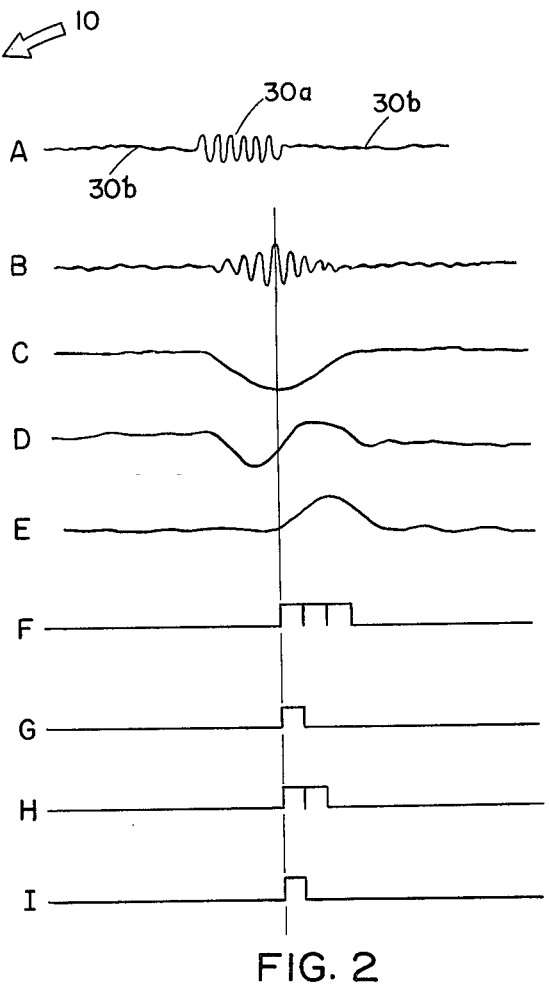
FIG. 2
FIG. 1

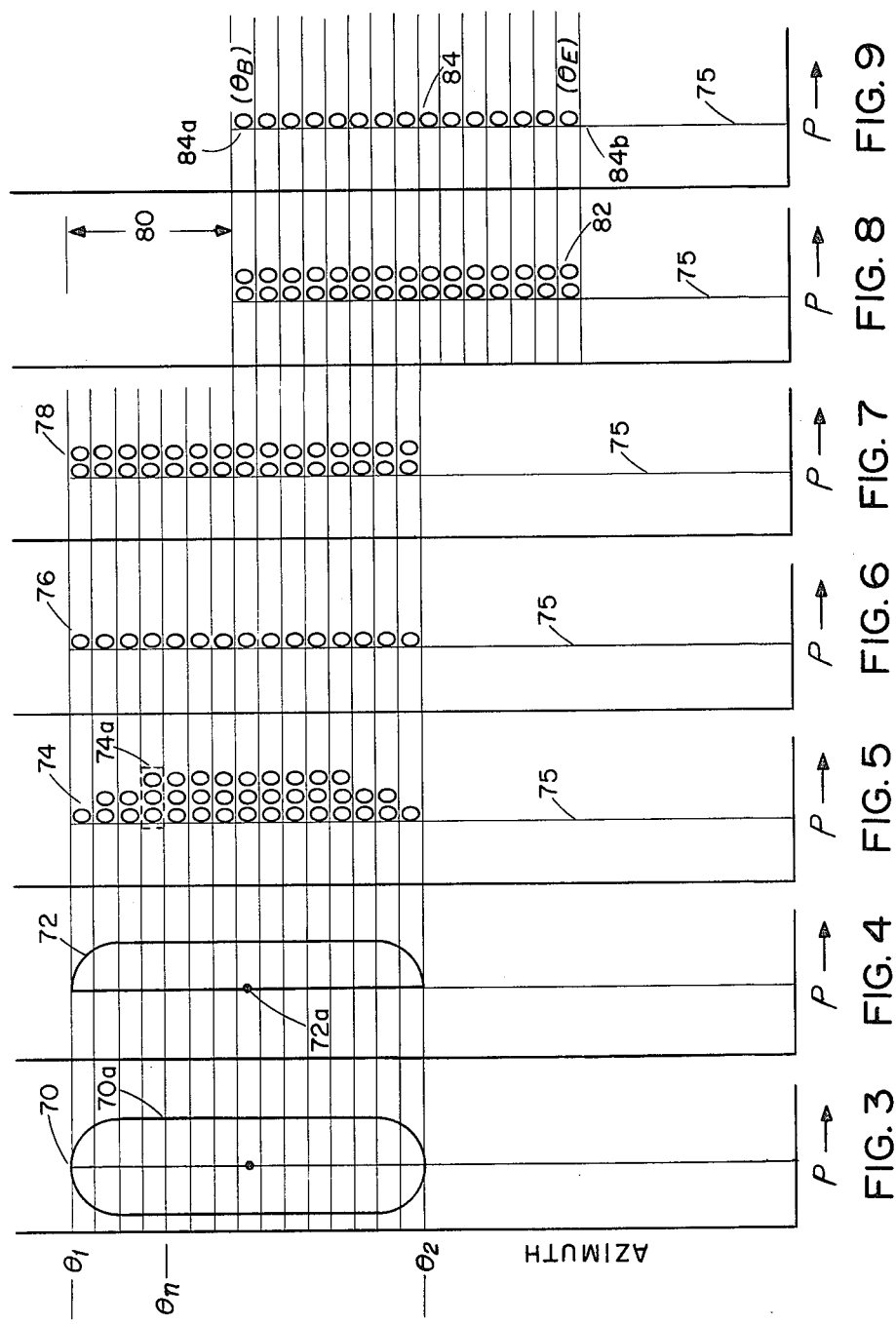

CFAR THRESHOLD ADAPTIVE TARGET COORDINATE EXTRACTOR

BACKGROUND OF THE INVENTION

Modern search radars with rotating antennas typically have a first threshold which is adaptive to the front end noise to yield a constant false alarm rate (CFAR) and having maximum detection sensitivity to an envelope detected received radar return signal. With this type of detector it is difficult to extract the target range and azimuth coordinates with the accuracy inherent in targets having a high signal-to-noise ratio.

In the radar arts there are several known techniques for determining the location of the center of a target whose radar return is received at a radar station. The simplest technique is to display the entire analog hit pattern on a plan position indicator (PPI) and depend upon the radar operator to estimate the center of the target. Since most radars use a transmitter pulse length shorter than the required range accuracy it is only necessary to beam split the displayed target in azimuth for good location estimation. Another technique is to use a wide transmitted pulse but use a wide bandwidth receiver to preserve the leading edge rise time of the return signal to provide range accuracy at the expense of sensitivity. Still another technique is the use of a low dynamic range receiver, such as Dicke Fix, that restricts the range stretching of the target returns. More sophisticated radars use a transmitted "search" waveform with crude range accuracy followed by a transmitted "track" waveform, possibly with pulse comparison, to obtain target coordinates on a single hit basis by differentiation and monopulse techniques. A still further technique involves the splitting of each range cell and comparing the resulting target coordinates in a computer to obtain the target azimuth centroid.

SUMMARY OF THE INVENTION

The present invention permits optimum IF filtering of radar target return signals, range clocking compatible with desired accuracy and available digital processing, and adaptive thresholds for constant false alarm rate. The invention provides one set of position coordinates for each target thus permitting minimum subsequent processing. More specifically, the present invention permits high sensitivity detection for low signal-to-noise ratio radar targets simultaneously with high range and azimuth accuracy for targets with high signal-to-noise ratio. In brief, the invention accomplishes the above mentioned goals by first differentiating the negative envelope of a detected radar return signal and taking the positive signal only, which, as should be obvious, begins at the zero slope or peak of the envelope detected signal. The position of the leading edge of the positive signal is taken as the target range independent of signal amplitude and it affords the maximum number of hits in azimuth at the corresponding range cell. The detection of a "hit" in this range cell is used to inhibit the detection of hits in immediately subsequent range cells. A hit in a particular range cell is integrated with hits in constant range adjacent range cells in a sliding window detector. The result of such integration is beam split to provide target coordinates having a constant bias offset introduced by the affects of integration. The bias offset is easily compensated to provide optimum target coordinates.

It is an object of this invention to provide a radar target coordinate extractor having optimized target coordinate extraction ability.

It is another object of this invention to provide a radar target return signal detector which is adaptive to provide improved detection sensitivity for targets having a low signal-to-noise ratio and improved target coordinate accuracy for targets having a high signal-to-noise ratio.

BRIEF DESCRIPTION OF THE DRAWINGS

FIG. 1 is a block diagram of one embodiment of the invention.

FIG. 2 represents the simplified waveforms of signals at various points in the circuit of FIG. 1.

FIGS. 3–9 comprise radar "hit" patterns and together are helpful in explaining the operation of the invention.

DESCRIPTION OF THE PREFERRED EMBODIMENT

Refer first to FIG. 1 which shows a radar set equipped with the CFAR threshold adaptive target coordinate extractor comprising an embodiment of the present invention. In particular, the elements within dashed block 10 comprise the usual radar elements, while the elements within dashed block 12 generally comprise the adaptive target coordinate extractor. The radar includes a transmitter 14 which supplies pulses through duplexer 16 for transmission by antenna 18. The transmitted pulse may be reflected from a radar target and returned to antenna 18 as a radar return signal. A plot of simple radar return signal is illustrated at FIG. 2, line A, where the return signal is the enhanced portion 30a riding on the background noise 30b. The radar return signal intercepted by antenna 18 is directed by duplexer 16 into the radar receiver, those elements below duplexer 16, and particularly into mixer 20 to be heterodyned with the radar system local oscillator frequency. The resulting frequency products are filtered and amplified to produce a receiver IF signal by the receiver IF section herein illustrated as IF amplifier 22 and which suitably includes a matched filter. The receiver IF signal is illustrated at line B of FIG. 2. The envelope of the negative going portion of the receiver IF signal is detected by envelope detector 24 to produce the signal form seen at line C of FIG. 2. The negative portion of the envelope is then differentiated and the positive portion only taken by elements 26 and 28, respectively, as represented at line D of FIG. 2 which shows the differential and line E which shows the positive portion of the differential. As should be obvious, the zero crossing of the differential and hence the leading edge of the positive portion (line E, FIG. 2) marks the range midpoint of the target return signal and is normally the optimum indication of actual target range.

The positive portion of the differentiated signal is thresholded in noise adaptive CFAR threshold 32. This type of threshold is of the type well known in the art to provide maximum detection sensitivity. One example of this type of threshold is a device which averages the signal plus noise in about ten adjacent range resolution cells and amplifies this average to provide the desired false alarm rate which will thereafter remain constant. Also as known to those skilled in the art, threshold 32 generates an output indicating the presence of a target so long as the input signal thereto exceeds a threshold set in accordance with receiver noise and this output signal is divided into range cells in accordance with the standard radar system range clocks applied to the threshold. The representation comprised of three range cells at line F of FIG. 2 shows that the threshold was exceeded during three range clocks in this embodiment.

The leading range cell only is retained by element 34 to produce the signal shown at line G of FIG. 2. This single range cell signal is doubled in width in element 36 to provide for low signal-to-noise ratio signals which may exceed the threshold for one range cell only. In essence, the doubling of the single range cell signal compensates for the noise modulation on a low signal-to-noise ratio signal which may cause the leading range cell to have time jitter. The representation of the doubled range cell signal from element 36 is shown at line H of FIG. 2.

The doubled range cell signals are applied to the M of N window detector 38 to reduce the false alarm rate, where M is the number of target returns in N radar transmissions of PRF's which must be detected to indicate a true target present. The double range cell signal for the low signal-to-noise ratio, time jitter, case meets the M threshold criteria in one or the other of the range cells. The high signal-to-noise ratio case signal meets the M threshold criteria in both range cells, with the leading range cell being taken as the center of the target. Thus, the doubled range cell allows detection commensurate with the signal-to-noise ratio of the target return.

Refer now to FIGS. 3 to 9 which show a representative target return on range-azimuth grid which is identical in each of these figures. Assume a $\rho$ - $\theta$ radar scan, where $\rho$ is range and $\theta$ is azimuth. In FIG. 3 ellipse 70 represents the prior art envelope detected radar target obtained as the radar beam sweeps through the azimuth $\theta_1$ to $\theta_2$. Fifteen PRF's from the radar are assumed as the radar beam scans through the aforementioned azimuth angle. Slice 70a of ellipse 70 represents the return from one particular transmitted radar pulse. As was common in the prior art, the range was split to produce the half ellipse 72 of FIG. 4 and the azimuth averaged or split to provide a center of target at point 72a. As an alternative the entire ellipse 70 of FIG. 3 could be displayed on a PPI to permit the observer thereof to estimate the target center. In the present invention the return signals from the transmitted pulses produce at the output of threshold 32 of FIG. 1 the pattern of hits in range cells shown at 74 of FIG. 5. In that figure, the target return from the radar pulse transmitted while the beam is at azimuth $\theta_n$ produces a hit in the three range cells 74a. Taking the leading range cell only and then doubling the range cell, as explained was done by elements 34 and 36 respectively of FIG. 1, produces the target indications 76 and 78, respectively, shown in FIGS. 6 and 7. In each case note that the range center of the assumed target lies at a range represented by line 75.

The M of N window detector of FIG. 1 displaces the target representation by an azimuth angle 80 which is related to the factor N to produce the displaced target patterns 82 and 84 of FIGS. 8 and 9, respectively. Since N is a constant this azimuth target displacement can be simply compensated as will be explained below.

Returning to FIG. 1, the leading range cell signals from element 40 (illustrated at line I of FIG. 2) are applied to beginning of target logic 44 and end of target logic 46. A range counter 48 and azimuth counter 50 are also provided. Range counter 48 is set to an initial count, suitably zero, by radar PRF's and thereafter incremented in response to the radar system range clock pulses so that the instantaneous count contained therein is a measure of range of the target from which the leading range cell signal resulted. Azimuth counter 50 is simply a counter coupled to the means for directing the pointing angle of the radar beam so that the count therein is a measure of the beam instantaneous pointing angle. Counters of the two above types are well known in the art.

Beginning of target logic 44 includes means for generating an output signal upon the occurrence of at least one first target return at the new range cell signal such as in range cell 84a of FIG. 9. In like manner, end of target logic generates an output upon the disappearance of target returns at a particular range during one or more consecutive azimuth scans. For example, the end of target signal is generated upon the absence of a target in range cell 84a of FIG. 9. The beginning of target signal opens gate 52 which allows the instantaneous reading of counter 50, which count, $\theta_B$, is a measure of the present antenna beam pointing angle, to be stored in memory 54. The end of target signal opens gate 58 which allows the instantaneous reading of counter 50, $\theta_E$, to be entered via gate 58 to circuit 56 which provides an output which is the average of $\theta_B$ and $\theta_E$, or an output which is a measure of the azimuth position of the target without compensation for bias error. Bias error consists of two fixed parts, the error due to the operation of detector 38 and the error due to the operation of logic circuits 44 and 46. A fixed bias correction is stored in memory 60 and applied in adder 62 to remove the bias error from the azimuth position signal. The corrected azimuth position signal is placed in a buffer storage 64 together with target range, which is entered from counter 48 through gate 42. The target coordinates are suitably read out of buffer storage 64 to utilization circuits (not shown) in response to the end of target signal which also gates the target range from counter 48 via gate 42 to buffer storage 64.

Having described an embodiment of our invention various alterations and modifications thereof should now be apparent to one skilled in the art. For example, after envelope detection by detector 24 of FIG. 1 the analog signal could be converted to a digital equivalent signal and digitally processed in accordance with the described functions. Accordingly, the invention is to be limited only by the true spirit and scope of the appended claims.

The invention claimed is:

1. A target coordinate extractor for a radar system which transmits a plurality of pulses at various contiguous scanning angles comprising a plurality of scans and including a radar receiver having a range clock, means for detecting the envelope of a radar target return signal comprising:

means responsive to said range clock for generating a range cell signal comprised of at least a single range cell and defining the peak of said envelope;

means for adding at least a contiguous range cell to said range cell signal, implying the presence of a target return in each of the range cells of said range cell signal;

an M of N window detector, where M and N are integers; for detecting the presence of a target return in at least M range cells at a certain fixed range in N contiguous scans; and, means responsive to the output signals from said window detector for determining the angular location of said radar target.

2. The target coordinate extractor of claim 1 wherein said means for generating a range cell signal comprises:
   means for selecting one of the leading and trailing halves of the differential of said envelope; and,
   a noise adaptive constant false alarm rate threshold responsive to said range clock for generating said range cell signal.

3. The target coordinate extractor of claim 2 wherein said radar system includes a range counter responsive to said range clock for providing a count which is a measure of the range of an instantaneous target return signal and a scanning angle counter which provides a count which is a measure of the instantaneous pointing angle of the radar beam and wherein said means for determining angular location comprises:
   beginning of target logic means for recording the count in said scanning angle counter upon the occurrence of the first of a range cell signal at a certain range; and,
   end of target logic means for determining the average of the instantaneous count in said scanning angle counter and the recorded count upon the occurence of the last of a range cell signal at a certain range, said average being related to the angular location of said radar target.

4. The target coordinate extractor of claim 3 wherein at least said window detector provides a predetermined fixed error bias to the angular location determined by said end of target logic means and with additionally;
   means for storing a bias correction signal related to said fixed error bias; and,
   means for adding said bias correction signal to said average to remove the error bias therein.

* * * * *